March 6, 1934. A. H. WOODWARD 1,949,509
CUTTING MEANS
Filed July 27, 1929 7 Sheets-Sheet 1

Witness
William P. Kilroy

Inventor
Arthur H. Woodward
By Brown, Jackson, Boettcher, + Dienner
attys.

March 6, 1934.  A. H. WOODWARD  1,949,509
CUTTING MEANS
Filed July 27, 1929  7 Sheets-Sheet 2

Fig. 2.

Inventor
Arthur H. Woodward
By Brown, Jackson, Boettcher,
& Dienner,
attys

Witness
William P. Kilroy

March 6, 1934.   A. H. WOODWARD   1,949,509
CUTTING MEANS
Filed July 27, 1929   7 Sheets-Sheet 3

Witness
William P. Kilroy

Inventor
Arthur H. Woodward
By Brown, Jackson, Boettcher, & Dienner
Atty

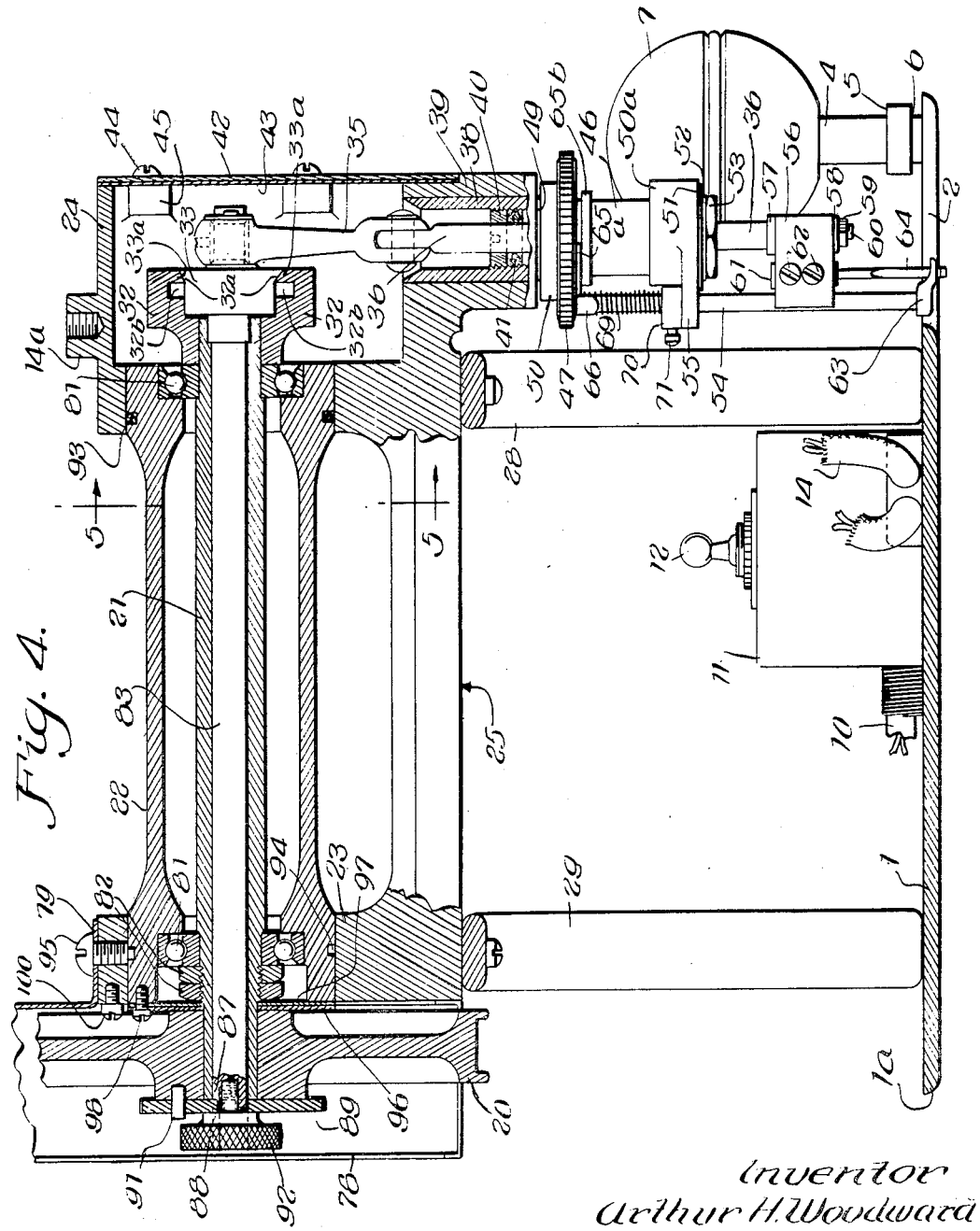

March 6, 1934.    A. H. WOODWARD    1,949,509
CUTTING MEANS
Filed July 27, 1929    7 Sheets-Sheet 5
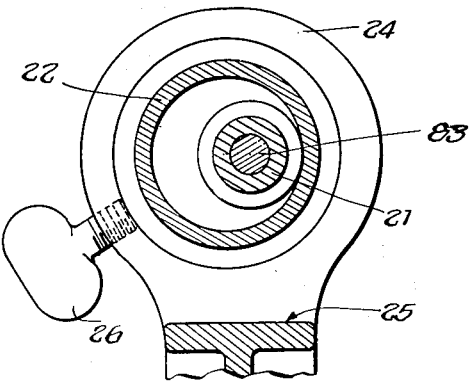
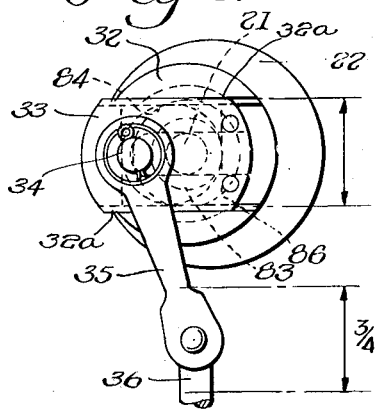
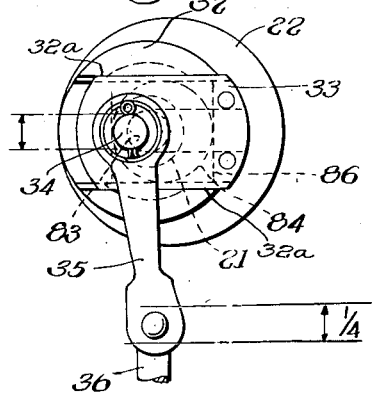
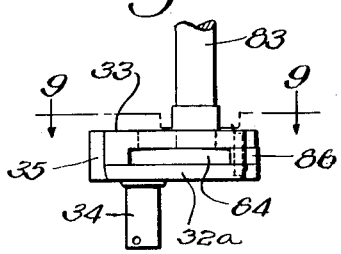
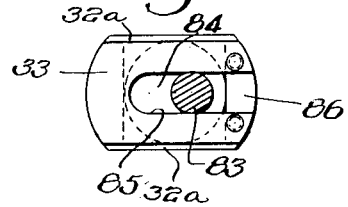
Inventor
Arthur H. Woodward
By Brown, Jackson, Boettcher & Dienner,
Attys.
Witness
William P. Kilroy March 6, 1934.  A. H. WOODWARD  1,949,509
CUTTING MEANS
Filed July 27, 1929  7 Sheets-Sheet 6

Witness
William P. Kilroy

Inventor
Arthur H. Woodward
By Brown, Jackson, Boettcher
& Dienner,
Atty.

March 6, 1934.　　　A. H. WOODWARD　　　1,949,509
CUTTING MEANS
Filed July 27, 1929　　　7 Sheets-Sheet 7
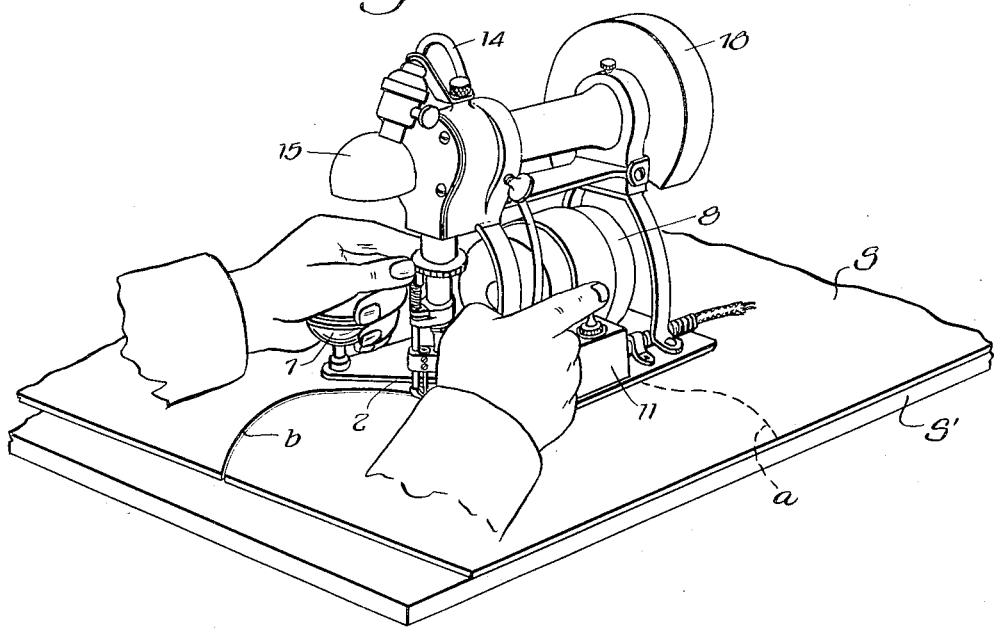
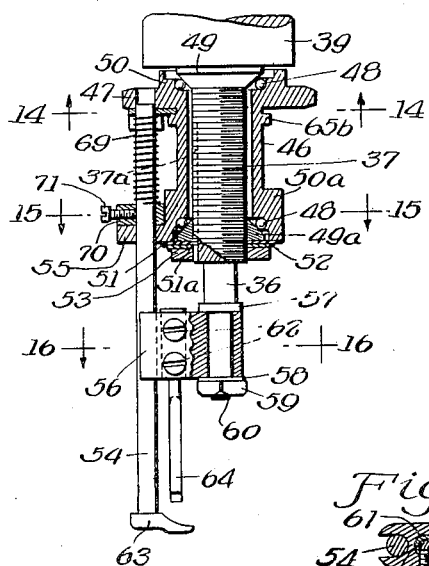
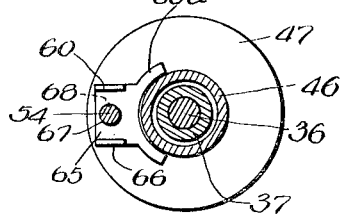
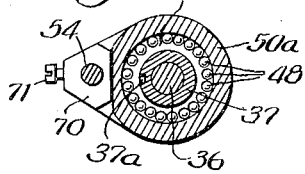
Witness
William P. Kilroy
Inventor
Arthur H. Woodward
By Brown, Jackson,
Boettcher & Diemer
Attys Patented Mar. 6, 1934

1,949,509

UNITED STATES PATENT OFFICE 1,949,509

CUTTING MEANS

Arthur H. Woodward, Winnetka, Ill., assignor to International Register Company, Chicago, Ill., a corporation of Illinois Application July 27, 1929, Serial No. 381,524

17 Claims. (Cl. 164—75)

This invention relates to cutting machines, and more particularly to machines employing a reciprocating cutter which is mounted on a plunger for movement about an axis eccentric to the cutting tool.

Machines of this character are used for cutting sheet material of various sorts, such as cloth, boards, composition boards, and numerous other materials in sheet form. It is the common practice to suspend these machines from a fixed support in such manner as to permit movement of the cutting tool along the line of the pattern to be cut, the supporting means being so disposed as to take the greater part of the weight of the machine off of a presser-foot or equivalent member disposed adjacent the cutting tool and moving over the material being cut.

In the movement of the presser-foot over the material, this foot trails the tool, due to the foot's eccentric mounting relative to the plunger, and holds the tool in proper position to cut along the line of the pattern. These machines are also provided with a material engaging shoe adjacent the cutting tool which travels upon the material and, in the case of cloth or similar relatively thin material, serves to maintain such material smooth and unwrinkled, facilitating the cutting operation. It has been commonly accepted that the member contacting the material being cut should support but little weight, as this member, due to its small area of contact, if subjected to appreciable weight, would be apt to cause movement and wrinkling of the material, thus defeating the purpose of providing such member.

I have found that, while the presser-foot follows the line of the pattern with sufficient accuracy when it is permitted to trail freely, it is desirable that means be provided whereby the presser-foot and the tool can be adjusted manually to position the tool accurately on the line at the start of the cutting operation.

It is possible, by providing a supporting member or base of relatively great area, to mount the motor and the entire machine upon such base, this base being moved over the material being cut and facilitating ease and accuracy in the cutting operation. This arrangement has numerous advantages over the cutting machines now in use, above referred to.

By mounting the entire machine upon the base plate, this machine can be used in any position desired and the machine can be carried to the work, avoiding the necessity of carrying the work to the machine, and the range or field of movement of the machine is unlimited except by the electric cord or cable by means of which the electric motor is connected into an electric circuit by means of a plug member in a known manner.

Obviously, this electric cord or cable can be of any desired length, so that, for all practical purposes, the machine has unlimited movement over the work. A further advantage of this construction is that the cutting tool is at all times disposed perpendicular to the work assuring ease and accuracy in the cutting operation.

My invention has to do more particularly with the means for controlling the operation of the machine, and adjusting and controlling the cutting tool. I provide means whereby the length of the stroke of the tool can be varied to suit the material being operated upon, and means for adjusting the tool vertically to vary the depth of the cut to suit conditions.

I also provide hand grips or handles associated with the base plate for moving the machine over the work, in conjunction with means for adjusting the cutting tool about the plunger and means for controlling the motor circuit, both of these means being disposed and adapted to be operated by the hands while grasping the handles. This gives complete control over the operation of the machine and the cutting tool, rendering it possible to cut with ease and accuracy along the lines of the selected patterns or designs.

Further objects and advantages of my invention will appear from the detailed description.

In the drawings:—

Fig. 2 is a rear end view of the machine;

Fig. 4 is a section taken substantially on line 4—4 of Fig. 3, the motor being omitted;

Fig. 5 is a section taken substantially on line 5—5 of Fig. 4;

Fig. 6 is a front view of the drive shaft and associated parts, showing the crank pin block in one extreme position for a long cutting stroke;

Fig. 7 is a view similar to Fig. 6 with the crank pin block in its other extreme position for a short cutting stroke;

Fig. 8 is a detail of the crank pin block and the adjusting rod therefor and associated parts;

Fig. 9 is a section taken substantially on line 9—9 of Fig. 8;

Fig. 12 is a perspective view of the machine in use;

Figure 1:
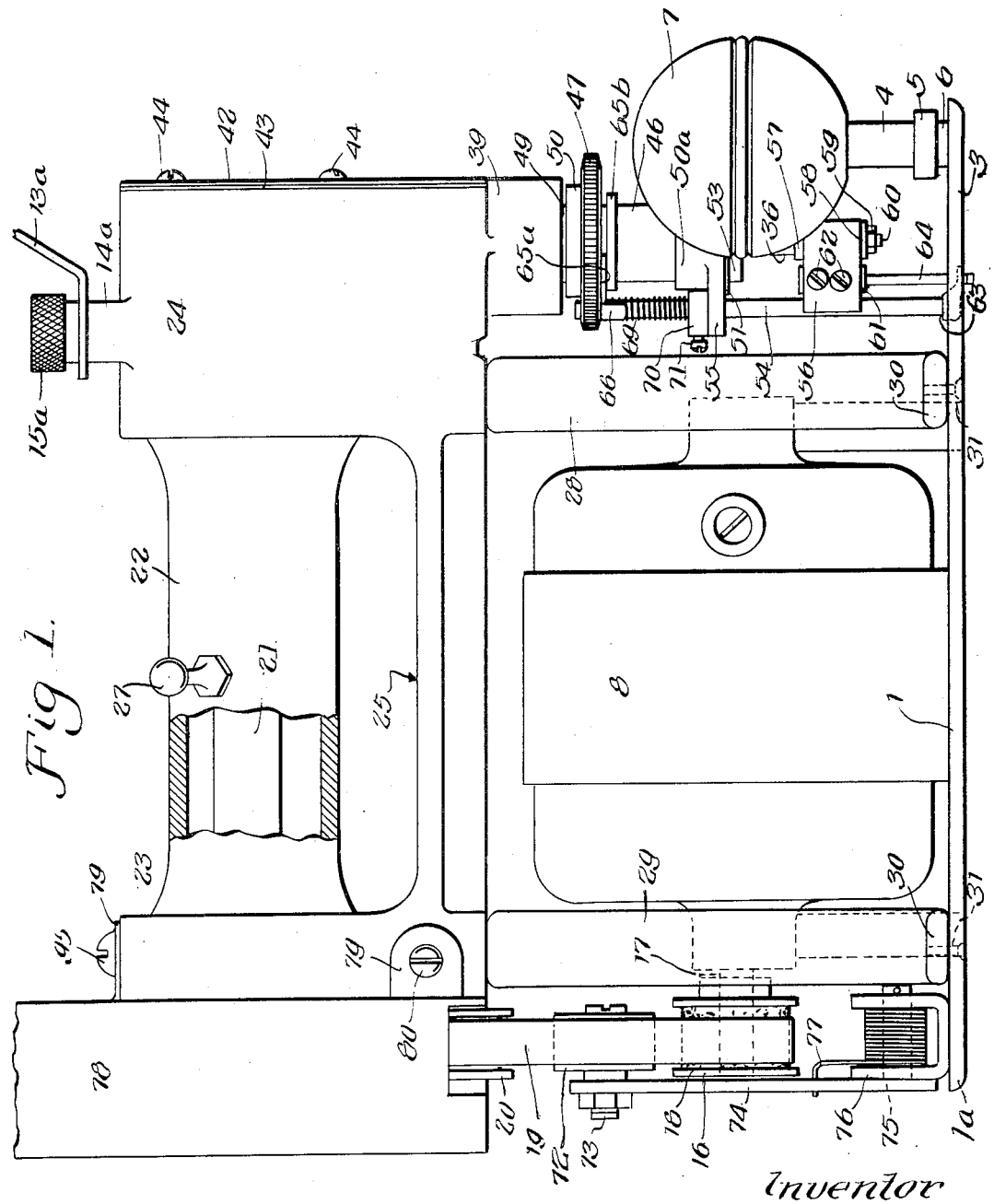
Fig. 1 is a side view of a cutting machine in accordance with my invention, partly broken away.

Fig. 13 is an elevation, partly broken away and in section, of the tool and presser-foot supporting and guiding means; and Figs. 14, 15 and 16 are sections taken substantially on lines 14—14, 15—15, and 16—16, respectively, of Fig. 13.

In constructing my machine I provide a base 1 in the form of a flat and substantially rectangular plate, the edges of which are rounded upwardly and outwardly at 1a. This plate is provided, in its forward end, with a cut-out or recess 2 of substantially V shape, forming projections 3 which extend forwardly from the body of the plate. A post 4 is suitably secured in the forward end of each of the projections 3 and this post is provided with an annular collar or shoulder 5 spaced away from the plate. This provides a groove or space 6 between the shoulder and the plate for reception of a suitable member for securing the plate to an associated supporting plate with the machine in inverted position when desired or as conditions may require. A knob 7 in the form of a sphere is suitably secured on the upper end of each post 4, these knobs providing hand grips or handles for moving the machine over the material being cut. It will be noted that these handles are disposed at the forward end of the machine and adjacent each side thereof, thus giving accurate control of the machine in manipulation thereof.

An electric motor 8 of suitable type is mounted upon the upper face of base plate 1 centrally thereof, the axis of this motor being preferably in the vertical plane of the longitudinal axis of the plate. The motor is secured to the plate in a suitable manner, as by means of screws (not shown), which pass through the plate and screw into the base 9 of the motor, the heads of these screws being countersunk in the under face of the plate. Current is supplied to motor 8 by means of a suitable cord or cable 10 provided at its free end with a plug member (not shown) for connecting the motor into an electric circuit in a known manner. The cord or cable 10 is connected to the motor through a switch 11 of known type which is controlled by a finger lever 12. This finger lever is adapted and disposed to be readily operated by the forefinger of a hand grasping the right hand handle 7, as shown in Fig. 12. Preferably the switch 11 is of a known type which permits two or more speeds of operation of the motor, the motor circuit being opened when the finger lever 12 is in vertical position. I also preferably provide a lamp socket 13 of known type connected by a cord 14 to the cord or cable 10 around switch 11. This socket is adapted to receive a suitable lamp globe (not shown), and carries a hood 15 for reflecting the light downwardly onto the line of the pattern to facilitate accuracy in cutting thereof. The socket 13 is carried by a bracket 13a mounted on a screw stud screwing downwardly into a boss 14a of the frame supporting the cutting tool operating means. A thumb nut 15a carries this screw stud and cooperates with the upper end of boss 14a for clamping the end of the bracket and holding it in desired position.

A pulley 16 is secured on the motor shaft 17 (Figs. 1 and 2), which projects rearwardly of the motor. The pulley is preferably provided with a covering 18 of cork or other suitable friction material. A fabric belt 19 passes about pulley 18 and about a pulley 20 secured on a drive shaft 21 (Fig. 1) which is mounted for rotation in a cylindrical casing 22. This casing is mounted at its ends for turning movement in housings 23 and 24 provided at the ends of a U-shaped frame 25. The casing 22 is held in adjustment by a thumb screw 26 (Figs. 10 and 11) which screws into the housing 24, and a suitable knob or handle 27 is secured to the casing 22 for effecting adjustment thereof.

The frame 25 is supported by front and back bows 28 and 29, respectively, which are secured to the housing in a suitable manner, as by screw means. These bows are turned outwardly at their lower ends to provide foot elements 30, which are bored and threaded for securing screws 31 which pass through the base plate 1 from beneath the same, the heads of these screws being countersunk in the under face of the base plate. The bows are disposed adjacent the ends of motor 8 and support the frame 25 above the motor, the axis of casing 22 being in a common vertical plane with the longitudinal axis of the motor 8 and the longitudinal axis of the plate 1. This provides a very compact arrangement in which the weight of the machine is distributed in such manner as to facilitate movement of plate 1 over the material, the center of gravity being low, assuring ease in manipulation of the machine.

Figure 3:
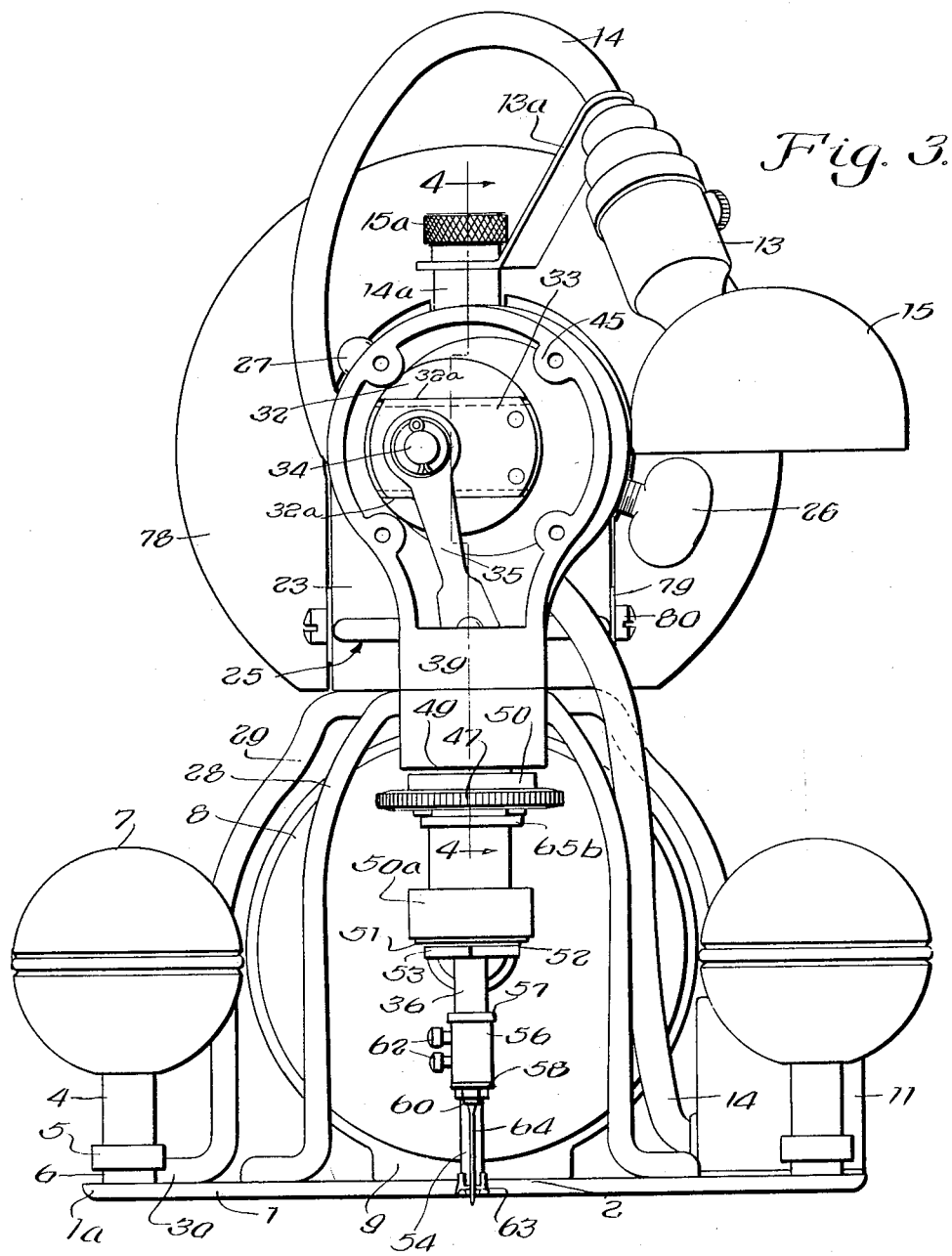
Fig. 3 is a front view of the machine with the crank housing cover plate removed.

Shaft 21 extends into housing 24 and is provided at its forward end with a flanged head 32 (Fig. 3). A block 33 is supported in the head 32 for movement diametrically thereof and is secured to the head for rotation therewith, in a suitable manner. This block carries a crank pin 34 which is disposed eccentrically to head 32. This pin is connected by a connecting rod 35 to a plunger 36 (Fig. 13) which is mounted for reciprocation in a reduced neck 37 depending from a ferrule 38 (see Fig. 4) secured in a downwardly extending collar 39 of the housing 24. This ferrule is interiorly threaded, at its lower portion, for reception of a follower 40 for compressing suitable packing material 41 between the follower and the lower end of the ferrule about the plunger 36 to prevent escape of an excessive amount of lubricant about the plunger. The housing 24 is adapted to receive and retain a suitable lubricant, such as a light grease, and is normally closed by a plate 42 and a gasket 43 secured to the front of the housing by screws 44 passing through the plate and the gasket and threading into suitable lugs 45 projecting inwardly from the sides of the housing.

A sleeve 46 is mounted for turning movement upon the depending neck 37 of ferrule 38. A disc 47 is secured upon the upper end of this sleeve and provides, in effect, a relatively wide annular flange extending completely about the sleeve. The periphery of this disc is suitably roughened, as by being knurled or serrated, to facilitate manipulation of the disc.

Bearing balls 48 are disposed about neck 37 of the ferrule, and are confined between cones 49 and 49a and collars 50 and 50a at the ends of sleeve 46. The collars are preferably formed integrally with the sleeve, and cone 49 is integral with ferrule 38. Cone 49a screws upon neck 37 for adjustment toward and away from cone 49. A locking ring 51, fitting about neck 37, closes the lower end of sleeve 46. This ring has a finger 51a which engages into a groove 37a in neck 37, locking the ring against turning upon the neck.

This ring is confined between the lower end of the sleeve and a washer 52 seating on the upper face of a nut 53 screwed onto the lower end of neck 37. The sleeve 46 is thus mounted on ball bearings so as to readily turn about the neck of ferrule 38.

As will be noted more clearly from Fig. 12, the disc 47 is so disposed as to be readily grasped by the thumb and the forefinger of the hand gripping the left hand handle 7 of the machine in the operation thereof. This permits the sleeve 46 to be turned about the plunger 36 into any desired position relative thereto for adjusting the cutting tool.

A presser-bar 54 has its upper end portion mounted for sliding movement through disc 47. This bar is slidable through an arm 55 at the lower end of sleeve 46 and projecting radially therefrom. The bar 54 is also slidable through a tool holder in the form of a block 56 which is mounted upon the lower end of plunger 36 for free turning movement thereon and is confined against movement axially of the plunger between a collar 57 at the upper face of the holder and a washer 58 at the lower face of the holder held in position by a nut 59 threaded upon a screw stud 60 at the lower end of the plunger.

This holder 56 is provided with a suitable socket member 61 (Fig. 16) shaped for reception of the shank of the tool, securing screws 62 threading through the holder 56 and the socket member 61 for contact with the tool shank for releasably securing the tool in the holder. A presser-foot 63 is secured upon the lower end of the presser-rod or bar 54, this foot being bifurcated to accommodate the cutting tool. I contemplate using either a saw or a chisel with this machine. When the machine is moved over the work a chisel 64 may be used, the blade of this chisel operating between the fingers of the presser-foot 63, and the shank of the chisel being secured in the member 61 by screws 62. I also provide a suitable saw blade which may be secured in the same manner as chisel 64. The teeth of this blade are so directed as to engage and cut the material when the blade is moved downwardly or away from the machine, but do not engage or cut the material on the up stroke. This blade is thus adapted for sawing material over which the machine is slid or moved.

As will be noted more clearly from Figs. 4 and 12, the cutting tool or chisel and the presser-foot are disposed in the vertex portion of recess 2 and at the transverse center of the base plate 1. In using the machine, when cutting with the chisel, it is supported upon the material to be cut by means of the base plate 1, the front portion being held raised to hold the chisel out of contact with the work, by grasping knobs 7.

Disc 47 is grasped between the thumb and the forefinger of the left hand and the switch is closed by the forefinger of the right hand. This closes the motor circuit and causes the chisel to be reciprocated at high speed. The forward portion of the machine is then lowered so as to bring the chisel into cutting relation to the work. As the machine is thus lowered, the chisel is adjusted, by means of disc 47, so as to start the cut accurately on the line of the pattern. In this manner the chisel is inserted into the work accurately at the initiation of the cutting operation. The machine is then slid over the work S, by means of knobs 7, so as to cause the tool to cut along the line a of the pattern, as at b. The presser-foot 63 contacts the work or sheet of material S and trails the tool holding it accurately to the line a. It is to be noted that the under face of base plate 1 is flat or planar and smooth, and is of great area relative to the base of the motor and the cutting mechanism so that the weight of the machine is distributed over a relatively great area permitting the plate to be slid over the work. The sheet S being cut, is supported upon a lower, thicker layer or sheet S' of suitable material, such as composition board or thick cardboard, into which the cutting edge of the chisel enters after it passes through the sheet S.

A holding plate 65 is carried by a fork 65a mounted for turning movement between disc 47 and a collar 65b of sleeve 46. For convenience in operation, the plate is provided, at each end thereof, with a depending finger 66. This place is also provided with an opening 67 which receives the presser-rod or bar 54.

This bar is provided with a notch 68 into which the plate engages for holding the bar 54 in raised position. Normally, in the operation of the machine, the bar 54 is released and the presser-foot 63 is yieldingly held against the upper face of the material by an expansion coil spring 69 mounted about bar 54 and confined between plate 65 and a collar 70 mounted about the bar and held against movement thereon by a set screw 71. Collar 70 has a flat face which coacts with a flat portion of collar 50a of sleeve 46 to hold bar 54 against turning in arm 56. This assures proper disposition of slot 68 relative to plate 65.

When using the machine for cutting sheet material with a chisel or other suitable tool, by movement of the machine over the material, the presser-foot 63 is yieldingly held in contact with the upper face of the material to guide the cutting tool and to hold the material down adjacent such tool facilitating the cutting operation. It is sometimes desirable, however, to hold the presser-foot 63 in inoperative position out of contact with the work. This is true, for example, when the machine is secured in inverted position and is held stationary, a saw blade being secured in the holder 56 and the material being sawed being moved relative to the saw blade or tool.

It is desirable that the belt 19 be maintained under sufficient tension to assure proper drive of the pulley 20. For this purpose a suitable belt tightener is provided.

This tightener comprises an idler wheel 72 rotatably mounted on a pin 73 secured in the upper end of an arm 74 provided, at its lower end, with a pin 75 secured therein and rockably mounted through the arms of a U-shaped bracket 76 suitably secured to base 1. A wire spring 77 is mounted about pin 75 and has one end bearing on base 1, this spring having its other end extended and shaped to form a pressure arm bearing against one edge of arm 74 and yieldingly urging it toward pulley 16. The wheel 72 bears upon the belt and maintains it under tension in a known manner.

I also provide a hood or guard 78 about pulley 20. This guard is formed of sheet metal and is provided with integral tabs 79. These tabs receive securing screws 80 which thread into the housing 23 and secure the hood to the housing.

The materials operated upon by this machine vary greatly in thickness and, for this reason, I provide means whereby the length of the stroke of the cutting tool can be adjusted with facility.

The operating shaft 21 is rotatably mounted in ball bearings 81 in the ends of sleeve 22. Nuts 82 screw onto the shaft and contact the outer face of the inner ring or race of the rear bearing. The terminal portions of the shaft are reduced in diameter providing shoulders which contact the inner faces of the inner rings or races of the bearings and cooperate with head 32 and nuts 82 to hold the shaft against endwise movement.

Shaft 21 is tubular and receives an adjusting and securing rod 83. This rod is provided, at its forward end, with an eccentric 84. This eccentric is disposed between the arms of block 32 which is of substantially elongated U-shape in longitudinal section (Figs. 8 and 9). The inner arm of the block is provided with a slot 85 which accommodates rod 83 and the eccentric is of a diameter to fit snugly between the end wall of the block and a spacer 86 riveted or otherwise suitably secured between the ends of the arms of the block. The eccentric also fits snugly between the arms of the block. In this manner any undesirable looseness or play between the eccentric and the block is eliminated.

Rod 83 projects rearwardly beyond the hub of pulley 20 and has a groove or keyway 87 extending from its rearward end. This keyway receives a stud 88 of an adjusting disc 89 disposed about the rod. Disc 88 is provided with a series of openings 90 (Fig. 2) suitably marked to indicate the length of the stroke of the tool for a given setting of the disc. These openings are adapted for reception of a pin 91 secured in the hub of pulley 20. A knurled thumb nut 92 screws upon rod 83 and normally holds disc 89 in operative position. The rod 83 is thus connected to pulley 20 for rotation therewith, this rod and the shaft 21 rotating as a unit, and block 33 is clamped to head 32.

Referring more particularly to Fig. 4, it will be noted that block 33 is provided, at each side thereof, with a shoulder 33a, the outer face of which is flush with the outer face of the block. The rearward face of this shoulder is inclined rearwardly and inwardly toward the block and seats upon a correspondingly shaped surface of an element 32a of head 32. When the thumbnut 92 is turned tightly upon rod 83, and bears against disc 89, the inclined surfaces of shoulders 33a are forced into wedging contact with the cooperating inclined surfaces of elements 32a. This provides a wedging action which is highly efficient and serves to lock the block tightly in the head in such manner as to eliminate possibility of the block working loose due to vibration in the use of the machine.

As will be noted more clearly from Fig. 9, the diameter of eccentric 84 corresponds to the width of the body of block 33, and this eccentric is disposed within the outlines of the body of the block when the eccentric pin 34 is in either of its extreme positions. To permit of the eccentric projecting beyond the sides of block 33, for moving the pin 34 into any selected intermediate position, the block is provided with arcuate grooves 32b (Fig. 4) opening into the groove of the head in which the block operates, these arcuate grooves being disposed to receive the projecting portion of eccentric 84 when it is turned into position to project beyond the block laterally thereof.

When it is desired to adjust the stroke of the tool, nut 92 is threaded off of the rod 83 sufficiently to permit of disengagement of disc 89 from pin 91 (see Fig. 2). The disc is then turned, thus turning rod 83 independently of the operating shaft. This serves to shift block 33 toward or away from the axis of shaft 21, thus adjusting the distance of pin 34 relative to the axis of the operating shaft and correspondingly varying the length of the stroke of the tool. The openings of the disc 89 are marked from "¼" to "¾", there being five such openings and the value of the markings thereof increasing by ⅛. When the pin 91 is in the ¼ opening, the length of the stroke of the tool is ¼ of an inch. The length of the stroke is increased ⅛ of an inch for each successive opening of the disc, from ¼, which is brought into engagement with the pin. The maximum length of the working stroke of the tool is ¾ of an inch. In Figs. 6 and 7 the adjusting disc is set to give the maximum and the minimum, respectively, length of stroke.

Connecting rod 35 is pivoted at its lower end to plunger 36 and is provided, at its upper end, with a sleeve which fits over the pin 34 and is normally held against movement toward the front end of the pin by a cotter pin inserted through eccentric pin 34, all of which is clearly shown in Figures 3 and 4. When the nut 92 is screwed off of the rod 83, and eccentric 84 is disposed within the outline of block 33, as in Figure 9, if the cotter pin be removed from eccentric pin 34 and the sleeve at the upper end of rod 35 is withdrawn from eccentric pin 34, block 33 may be removed from the head 32 by moving the block and the rod 83 toward the front of the casing 24. By removing the front plate 42 of the casing and disconnecting rod 35 from pin 34, the block 33 may thus be removed and replaced with facility. The head 32 provides a rotatably mounted operating member, and the block 33 provides, in conjunction with the pin 34, a connecting member for connecting the rod 35 to the head 32. These members are preferably disposed adjacent the back of the casing and, by removing front plate 42, the block or member 33 can be removed and replaced with facility, as will be clear from Figure 4.

The casing or sleeve 22 is mounted to turn in housings 23 and 24 (Fig. 4) as previously noted. A packing ring 93 is mounted in a groove in the end of sleeve 22 within housing 24 to prevent leakage of lubricant from this housing about the sleeve. At its other end, sleeve 22 is provided with a circumferential groove 94 which receives the point of a dog pointed screw 95 passing through the top tab 79 of guard 80 and screwing into housing 23. This screw serves to hold the sleeve 22 against endwise movement.

The rearward end of sleeve 22 is closed by a plate 96 and a gasket 97 secured to the sleeve by screws 98. This plate has two stop elements or fingers 99 (Fig. 2) disposed to contact a screw 100 secured in housing 23. This serves to limit turning of sleeve 22 in either direction.

Figure 10:
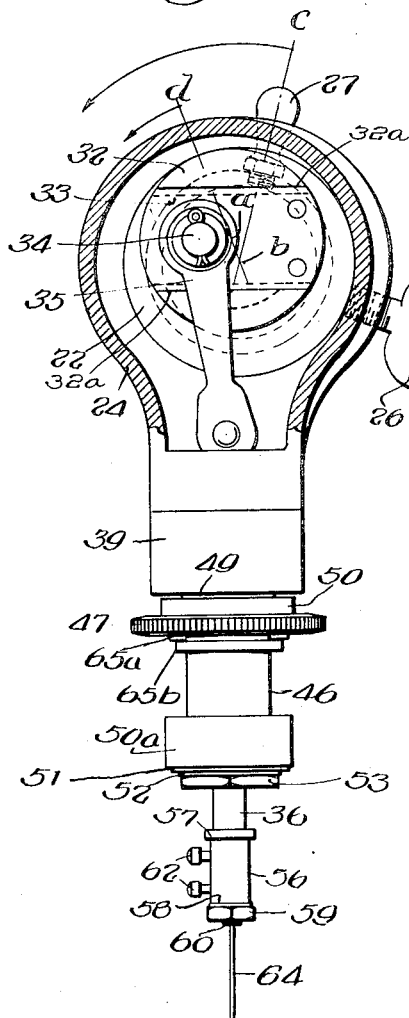
Fig. 10 is a front view of the crank housing and associated parts, partly broken away and in section, showing the position of the drive shaft when the supporting sleeve therefore is in one extreme position, to raise the crank shaft.
Figure 11:
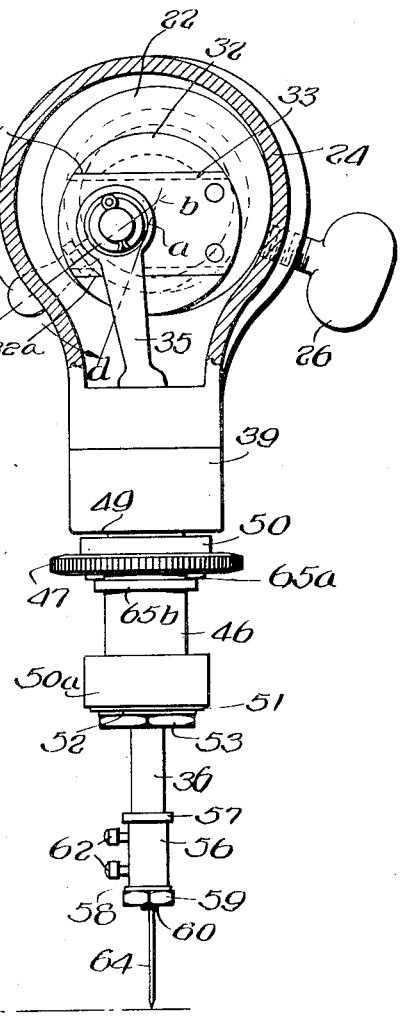
Fig. 11 is a view similar to Fig. 10 with the crank shaft in its lowermost position.

Shaft 21 is disposed eccentric to sleeve 22 (Fig. 5) so that by turning the sleeve in proper direction, the cutting tool can be adjusted toward or away from the work so as to vary the depth of the cut as required. This adjusting of the shaft 21, and consequently of the tool, will be understood more clearly from Figs. 10 and 11. In Fig. 10 the shaft 21 is in its highest position, the center of this shaft being at $a$ and the center of sleeve 22 being at $b$, the vertical distance between these two centers being $a'$. If the sleeve be turned in a counterclockwise direction, as indicated in Fig. 10, so as to move the radius $b$—$c$ of sleeve 22 into the position of Fig. 11, the radius $b$—$d$ of the sleeve which intersects the axis of shaft 21 will occupy the position illustrated in Fig. 11. The axis $a$ of shaft 21 will now be below center $b$ of sleeve 22 a distance equal to $a'$, so that the shaft 21, and consequently the cutting tool, has been lowered through a distance equal to $2a'$, this distance being indicated by A. This represents the extreme distance through which the cutting tool can be adjusted vertically in either direction. The tool can be adjusted to any desired extent between these two extremes by proper turning of sleeve 22. This adjustability of the tool for depth of cut, in conjunction with the means for varying the length of the stroke of the tool, permits materials of a great variety of thicknesses to be cut to advantage, as well as enabling the tool to be adjusted to cut accurately to a desired depth for a given length of stroke.

What I claim is:—

1. In a cutting machine of the character described, a plunger, and operating means for reciprocating the plunger, said operating means including means for varying the length of the stroke of the plunger, and supplemental means for adjusting the plunger toward and away from the work independently of the stroke adjustment of the plunger.

2. In a cutting machine of the character described, a base plate having a flat under face a motor mounted on the plate, a reciprocably mounted plunger supported thereby, a tool holder carried by the plunger for movement therewith and connected to the plunger for relative movement about the same, said holder having tool receiving and securing means eccentric to the plunger, driving connections between the motor and the plunger, a sleeve mounted about the plunger for relative turning movement, and a connection between the sleeve and the tool holder for turning the latter with the sleeve.

3. In a cutting machine of the character described, a reciprocably mounted plunger, a tool holder mounted on the plunger for movement therewith and having relative movement about the plunger, means for reciprocating said plunger, the tool holder having tool receiving and securing means eccentric to the plunger, a sleeve mounted for turning movement about the plunger and provided with a concentric and relatively wide flange extending about the sleeve for turning the same manually, and a connection between the sleeve and the tool holder for turning the latter with said sleeve.

4. In a cutting machine of the character described, a reciprocably mounted plunger, a tool holder mounted on the plunger for movement therewith and having relative movement about the plunger, means for reciprocating said plunger, the tool holder having tool receiving and securing means eccentric to the plunger, a sleeve mounted for turning movement about the plunger, a member secured to the sleeve and adapted and disposed to be grasped by the fingers for manually turning said sleeve about the plunger, and operating connections between the sleeve and the tool holder.

5. In a cutting machine of the character described, a base plate having a planar under face adapted to rest upon and be moved over the material being cut, an electric motor mounted on said plate, a supporting structure on the plate, a plunger mounted in said structure for reciprocation perpendicularly to the plate, a tool holder connected to the plunger for reciprocation therewith and having tool receiving and securing means eccentric to the plunger, said holder having relative movement about the plunger, means mounted for turning movement about the plunger and connected to the tool holder for positioning the latter, two handles secured to the base plate, said member being disposed and adapted to be manipulated by the fingers of a hand grasping one of the handles, and a motor control member disposed and adapted to be operated by the fingers of a hand grasping the other handle.

6. In a cutting machine of the character described, a base plate having a planar under face adapted to rest upon and be moved over the material being cut, an electric motor mounted on said plate, a supporting structure on the plate, a plunger mounted in said structure for reciprocation perpendicularly to the plate, a tool holder connected to the plunger for reciprocation therewith and having tool receiving and securing means eccentric to the plunger, said holder having relative movement about the plunger, a tool positioning member mounted for turning movement about the plunger, a yieldingly pressed presser-bar connecting the member and the tool holder, a tool guiding member carried by said bar, two handles secured to the base plate, said positioning members being disposed and adapted to be manipulated by the fingers of a hand grasping one of the handles, and a motor control member disposed and adapted to be operated by the fingers of a hand grasping the other handle.

7. In a cutting machine of the character described, a base plate having a planar under face adapted to rest upon and be moved over the material being cut, an electric motor, a plunger mounted upon the plate for reciprocation perpendicularly thereto, driving connections between the motor and the plunger, a tool holder carried by the plunger for reciprocation therewith and having tool holding and securing means eccentric to the plunger, said holder having relative movement about the plunger, a tool positioning member mounted for movement about the plunger and having operating connection with the holder, two handles secured to and projecting upwardly from the base plate, a finger piece secured to said member and disposed and adapted to be manipulated by the fingers of a hand grasping one of the handles for turning the holder into any desired position about the plunger, and a switch controlling the motor circuit and having an operating member disposed and adapted to be operated by the fingers of a hand grasping the other handle.

8. In a cutting machine of the character described, a base plate having a planar under face adapted to rest upon and be moved over the material being cut, a plunger mounted upon the plate for reciprocation perpendicularly thereto, power means for reciprocating the plunger, the plate having lateral forwardly extending projections and the plunger operating between said projections, a tool holder carried by the plunger for reciprocation therewith and having tool receiving and securing means eccentric to the plunger, handles extending upwardly from said extensions in advance of the plunger, said tool holder having turning movement about the plunger, means disposed and adapted to be operated by the fingers of a hand grasping one of the handles for turning the tool holder into any desired position about the plunger, and means disposed and adapted to be operated by the fingers of a hand grasping the other handle for controlling said power means.

9. In a cutting machine of the character described, a base plate having a planar under face adapted to rest upon and be moved over the material being cut, a plunger mounted upon the plate for reciprocation perpendicularly thereto, power means for reciprocating the plunger, a tool holder carried by the plunger for reciprocation therewith and having tool receiving and securing means eccentric to the plunger, two handles extending upwardly from the base plate, said tool holder having turning movement about the plunger, means disposed and adapted to be operated by the fingers of a hand grasping one of the handles for turning the tool holder into desired position about the plunger, and means disposed and adapted to be operated by the fingers of a hand grasping the other handle for controlling said power means.

10. In a cutting machine of the character described, a reciprocating plunger, a tool holder mounted on the plunger for reciprocation therewith and having turning movement about the plunger, the tool holder having tool receiving and securing means eccentric to the plunger, a guide mounted for turning movement about the plunger, a yieldingly pressed presser-rod mounted in said guide and engaging the tool holder, a presser-foot at the lower end of said rod, and means for releasably securing the rod in raised position.

11. In a cutting machine of the character described, a reciprocating plunger, a tool holder mounted on the plunger for reciprocation therewith and having turning movement about the plunger, the tool holder having tool receiving and securing means eccentric to the plunger, a guide mounted for turning movement about the plunger, a yieldingly pressed presser-rod mounted in said guide and engaging the tool holder, a presser-foot at the lower end of said rod, and a latch movable relative to the rod, said rod having means cooperating with the latch for releasably securing the rod in raised position.

12. In a cutting machine of the character described, a sleeve, a drive shaft mounted in the sleeve eccentrically thereof, said sleeve being adjustable on its axis for adjusting the shaft toward and away from the work, a plunger, a pitman rod connected at one end to the plunger, and an eccentric driving connection between the shaft and the other end of the pitman rod, said connection being adjustable toward and away from the axis of the shaft to vary the length of the stroke of the plunger.

13. In a cutting machine of the character described, a sleeve, a drive shaft mounted in the sleeve eccentricaly thereof, said sleeve being adjustable on its axis for adjusting the shaft toward and away from the work, a plunger, and an eccentric driving connection between the plunger and the shaft, said connection being adjustable to vary the length of the stroke of the plunger.

14. In a cutting machine of the character described, a drive shaft, said shaft being eccentrically mounted for adjustment toward and away from the work, a plunger, and an eccentric driving connection between the plunger and the shaft, said connection being adjustable to vary the length of the stroke of the plunger.

15. In a cutting machine of the character described, a base plate having a planar under face adapted to rest upon and be moved over the material being cut, a plunger mounted upon the plate for reciprocation perpendicularly thereto, power means for reciprocating the plunger, tool receiving means carried by the plunger and adapted for reception of a cutting tool, a presser foot disposed to bear upon the material adjacent the tool, means for varying the length of the stroke of the plunger, and means for adjusting the plunger toward and away from the material while maintaining unvaried the pressure exerted upon the material by the presser foot.

16. In a cutting machine of the character described, a base plate having a planar under face adapted to rest upon and be moved over material being cut, a casing adjacent the front of the plate and comprising a removable front closure member, a crank pin carrying structure rotatably mounted within the casing, said structure being normally confined against endwise movement and being removable from and replaceable in the casing by endwise movement toward the front and the back thereof, respectively, a reciprocating plunger, operating connections between the plunger and the crank pin, said connections being releasable for removal and replacement of the crank pin structure, and means for driving said crank pin carrying structure.

17. In a cutting machine of the character described, a base plate having a planar under face adapted to rest upon and be moved over material being cut, a casing supported by the plate and comprising a removable closure member, a crank pin carrying structure rotatably mounted within the casing, said structure being normally confined against endwise movement and being removable from and replaceable in the casing by endwise movement, a reciprocating plunger operating in the casing, operating connections between the crank pin and the plunger, said connections being releasable for removal and replacement of the crank pin structure, an electric motor supported by the plate, and driving connections between the motor and the crank pin structure.

ARTHUR H. WOODWARD.